United States Patent
Burnett

(10) Patent No.: US 6,470,426 B2
(45) Date of Patent: Oct. 22, 2002

(54) METHOD AND APPARATUS FOR LOADING A CACHE WITH DATA WITH A SUBSEQUENT PURGE OF STALE CACHE INFORMATION

(75) Inventor: Rodney Carlton Burnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 09/738,063

(22) Filed: Dec. 15, 2000

(65) Prior Publication Data

US 2002/0078301 A1 Jun. 20, 2002

(51) Int. Cl.$^7$ .............................................. G06F 12/00
(52) U.S. Cl. ..................................................... 711/133
(58) Field of Search .................................. 711/133, 159

(56) References Cited

U.S. PATENT DOCUMENTS 5,787,470 A * 7/1998 DeSimone et al. ......... 711/124
5,875,468 A * 2/1999 Erlichson et al. ........... 711/143

* cited by examiner

*Primary Examiner*—Jack A. Lane
(74) *Attorney, Agent, or Firm*—Duke W. Yee; Jeffrey S. LaBaw; Stephen R. Tkacs

(57) ABSTRACT

A mechanism is provided for the acquisition of a data set key prior to starting a populate. This key, referred to as the cache epoch, is obtained from cache implementation by the cache manager that is performing the populate. The returned cache epoch is kept in the cache as the new pending epoch value. The cache manager then proceeds to load the cache with the new data set. As the data is added, the cache associates the data with the pending epoch value. When the populate is complete, the cache manager commits the acquired epoch in the cache and, subsequently, the cache proceeds to purge all data that is not part of the committed epoch.

22 Claims, 4 Drawing Sheets

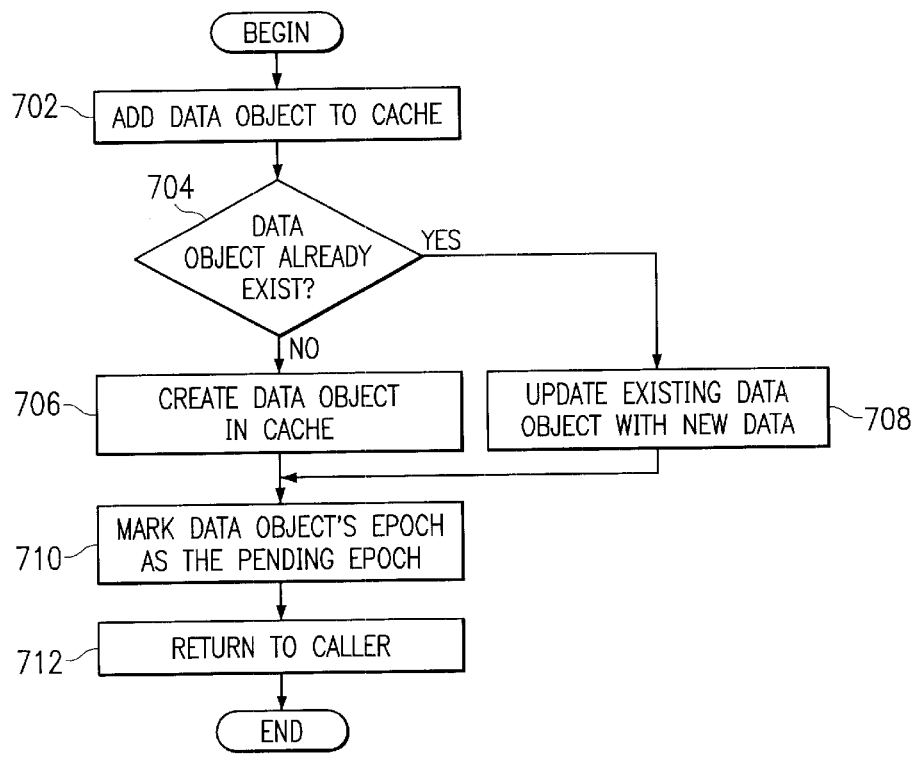
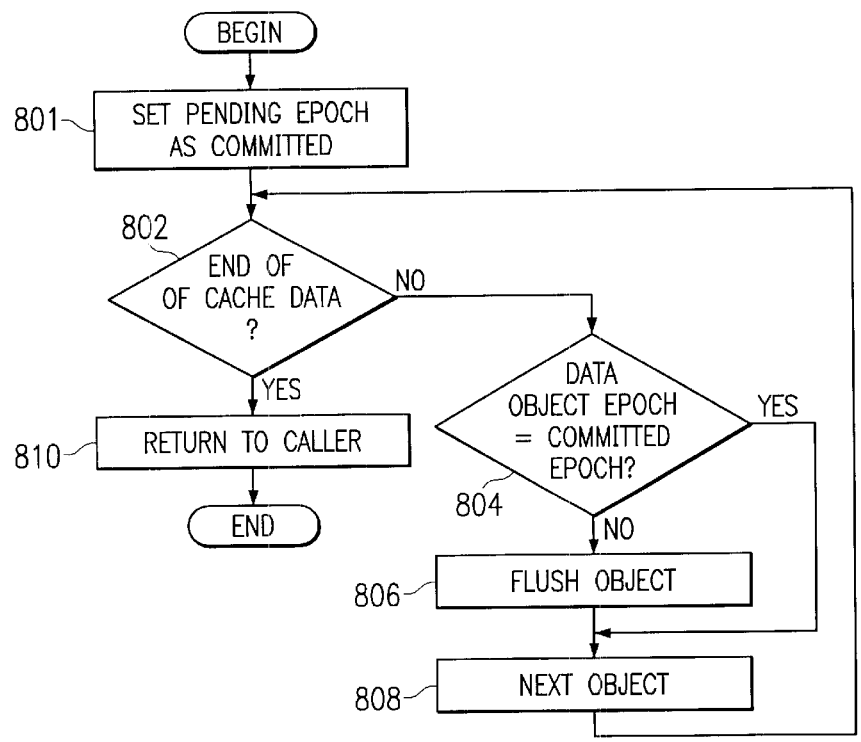

METHOD AND APPARATUS FOR LOADING A CACHE WITH DATA WITH A SUBSEQUENT PURGE OF STALE CACHE INFORMATION

BACKGROUND OF THE INVENTION

1. Technical Field

The present invention relates to a data cache and, in particular, to loading a cache with a new set of data without a preceding flush of current data. Still more particularly, the present invention provides a method, apparatus, and program for loading a cache with new and updated data and with a subsequent purge of stale cache information.

2. Description of Related Art

In a system in which a cache of data is managed by a cache manager, it may become necessary to populate the cache with a new set of data from a master source. However, it may be desirable to keep the current loaded data set active while the cache is populated with new data. The populate may add new data or update existing data. Once the populate is complete and committed, then old data which is not part of the new data set should be purged. For example, if the data set represents a set of security access rules, then flushing the existing data set prior to the populate may open a security exposure window if that rule is reloaded with the new data set.

Therefore, it would be advantageous to maintain the data set until the new populate is completed, which could update existing data and add new data, and to then purge any stale data from the original data set from the cache.

SUMMARY OF THE INVENTION

The present invention provides a mechanism for the acquisition of a data set key prior to starting a populate. This key, referred to as the cache epoch, is obtained from cache implementation by the cache manager that is performing the populate. The returned cache epoch is kept in the cache as the new pending epoch value. The cache manager then proceeds to load the cache with the new data set. As the data is added, the cache associates the data with the pending epoch. When the populate is complete, the cache manager commits the acquired pending epoch in the cache and, subsequently, the cache proceeds to purge all data that is not part of the committed epoch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart of a process for adding or updating a data object in accordance with a preferred embodiment of the present invention; and FIG. 8 is a flowchart illustrating a process for committing the epoch in accordance with a preferred embodiment of the present invention.

DETAILED DESCRIPTION OF THE PREFERRED EMBODIMENT

Figure 1:
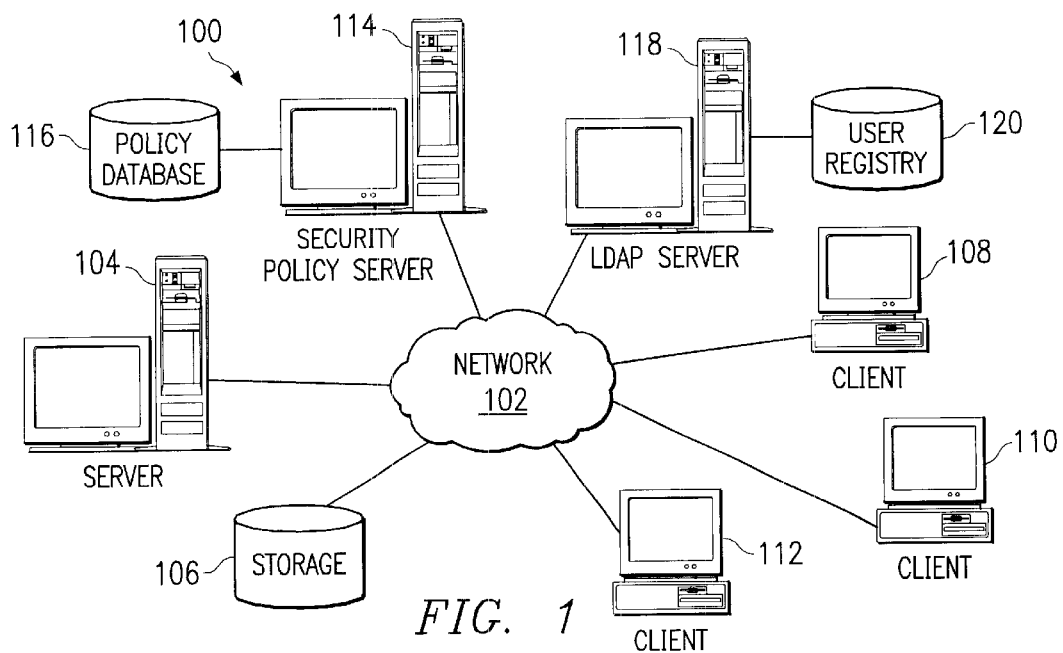
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. For example, network data processing system 100 may include a security policy server 114 connected to policy database (DB) 116 and lightweight directory access protocol (LDAP) server 118 connected to user registry 120. LDAP is used to access a directory listing.

An external security manager for operating systems provides a layer of authorization policy enforcement in addition to that provided by the native operating system. An administrator defines additional authorization policy by applying fine-grained access controls that restrict or permit access to key system resources. Controls are based on user identity, group membership, the type of operation, time of the day or day of the week, and the accessing application. An administrator may control access to specific file resources, login and network services, and changes of identity. These controls may also be used to manage the execution of administrative procedures and to limit administrative capabilities on a per user basis. In addition to authorization policy enforcement, such a manager provides mechanisms to verify defined policy and audit authorization decisions.

Access controls are stored in a policy database that is centrally maintained in the computing environment. The accessing user definitions are stored in a user registry that is also centrally maintained in the environment. When protected resources are accessed, the manager performs an authorization check based on the accessing user's identity, the action, and the resource's access controls to determine if access should be permitted or denied. Those skilled in the practiced art would recognize the above described software system as one or more variations of existing implementations.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
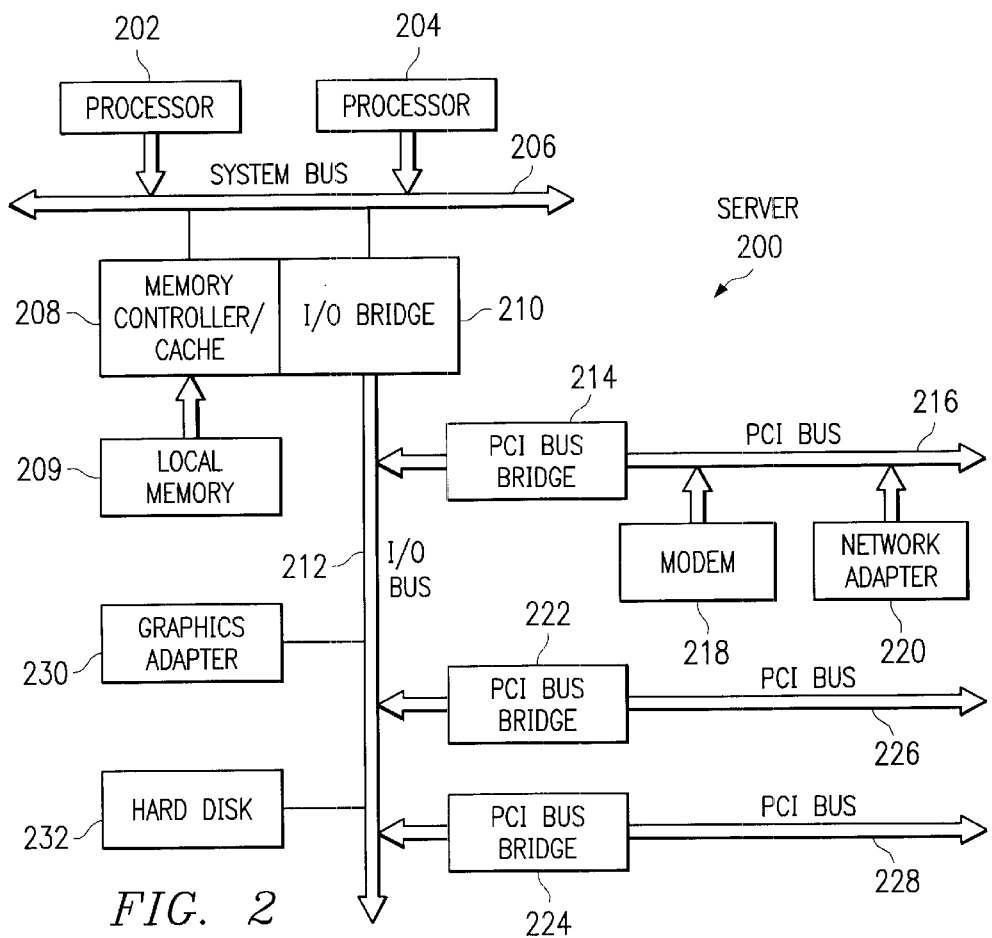
FIG. 2 is a block diagram of a data processing system that may be implemented as a server in accordance with a preferred embodiment of the present invention.

Referring to FIG. 2, a block diagram of a data processing system that may be implemented as a server, such as servers 104, 114, 118 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
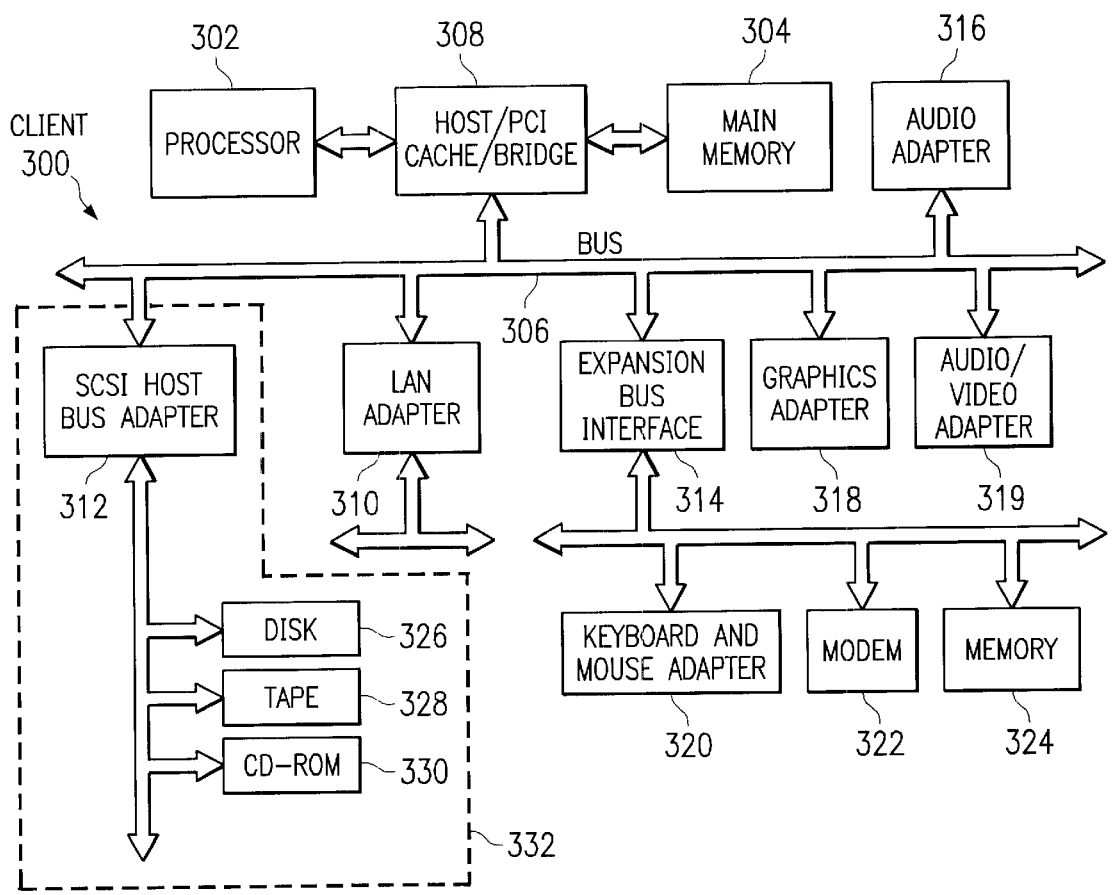
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
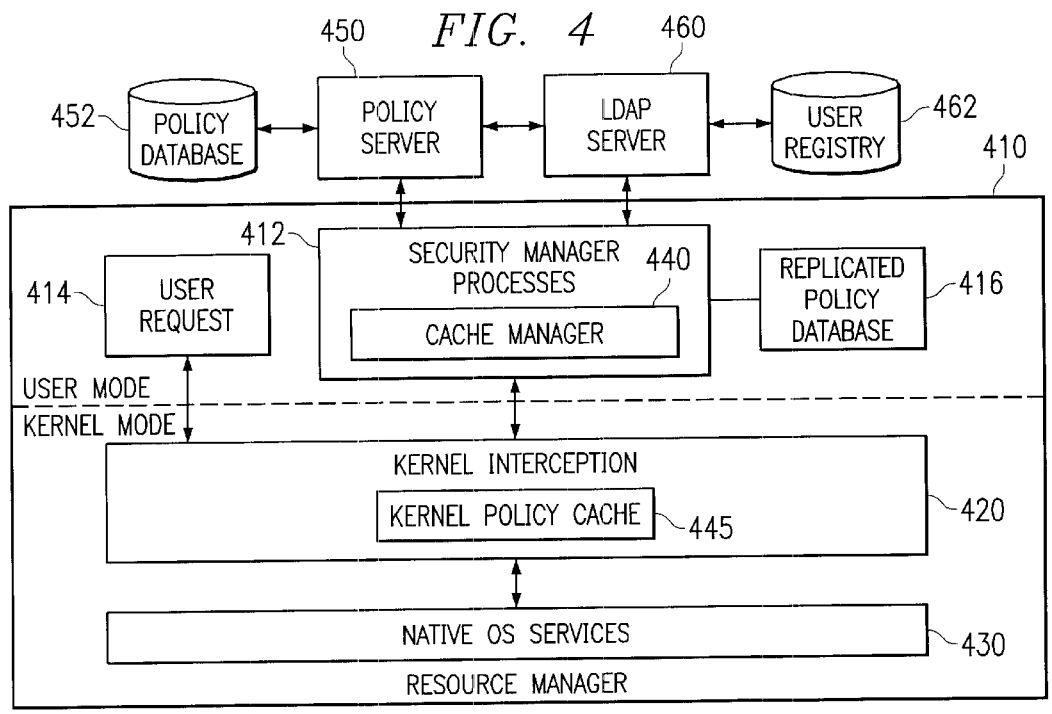
FIG. 4 is a block diagram of an external security manager for operating systems in accordance with a preferred embodiment of the present invention.

With reference now to FIG. 4, a block diagram of an external security manager for operating systems is shown in accordance with a preferred embodiment of the present invention. The environment includes two main databases used by a resource manager 410, which may run on any computer in the network where policy enforcement is needed. The first database, the user registry 462, stores the user and group definitions and is used for managing and identifying users in the security manager environment. The registry perhaps would be accessible through an LDAP enabled server 460. The second database, a policy database 452 served by a policy server 450, stores all of the policy defined for each of the resource managers to enforce security. The policy database is where the access controls are stored.

Resource managers may access these two databases over a network, such as network 102 in FIG. 1, using TCP, secured by Secure Socket Layers (SSL). Although the information is stored in centrally maintained policy databases, the information required to make authorization decisions may be replicated and cached in a local database at the resource manager's point of security enforcement 416. This would enable authorization policy to continue to be enforced even if the Policy server or the User Registry server becomes inaccessible. Security manager processes 412 may operate in the user mode. A user request 414 is received through system provided application program interfaces (API), which eventually arrives in the operating system kernel. The resource manager intervenes in targeted operations to resources which it provides protection for through a series of interception points 420 which reside on top of native kernel operation system services 430.

Cache manager 440 subscribes to the master security policy and loads a kernel policy cache 445 within kernel interception component 420 with the policy rules. Cache manager 440 that populates the kernel policy cache with data from a master source, namely the replicated policy database. Loading the data in the kernel places it close to the point of interception for maximum performance and provides the added security and boundary protection of the operating system kernel.

To prevent security exposure, it is necessary to keep the current loaded data set active while a population of new or updated policy occurs. Ideally, during the population, updated policy should take effect immediately implying and "update in place" approach. Keeping the current cached policy active prevents a potential security exposure that may result if restrictive policy is flushed, or not kept active during the populate.

In accordance with a preferred embodiment of the present invention, a mechanism is provided for the acquisition of a data set key prior to starting a populate. This key, referred to as the cache epoch, is obtained from cache implementation by the cache manager that is performing the populate. The returned cache epoch is kept in the cache as the new pending epoch value. The cache manager then proceeds to load the cache with the new data set. As the data is added, the cache associates the data with the new pending epoch. When the populate is complete, the cache manager commits the acquired epoch in the cache and, subsequently, the cache proceeds to purge all data that is not part of the committed epoch.

Figure 5:
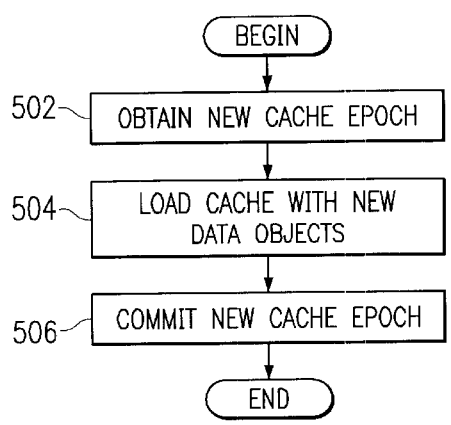
FIG. 5 is a flowchart illustrating a cache loading process in accordance with a preferred embodiment of the present invention.

With reference to FIG. 5, a flowchart is shown illustrating a cache loading process in accordance with a preferred embodiment of the present invention. The process begins and obtains a new cache epoch (step 502). The process then loads the cache with new data objects (step 504). A process for adding or updating a data object is described below with respect to FIG. 7. Thereafter, the process commits the new cache epoch (step 506) and ends. A process for committing a cache epoch is described below with respect to FIG. 8.

Figure 6:
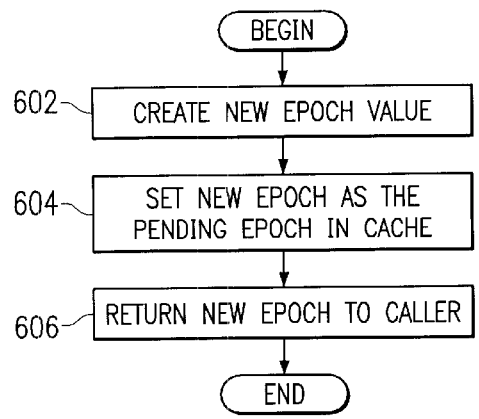
FIG. 6 is a flowchart illustrating a process for creating a cache epoch in accordance with a preferred embodiment of the present invention.

With respect to FIG. 6, a flowchart is shown illustrating a process for creating a cache epoch in accordance with a preferred embodiment of the present invention. The process begins and creates a new epoch value (step 602). The process then sets the new epoch as the pending epoch in the cache (step 604). Thereafter, the process returns the new epoch to the caller (step 606) and ends.

Turning now to FIG. 7, a flowchart of a process for adding or updating a data object is shown in accordance with a preferred embodiment of the present invention. The process begins and adds a cache data object (step 702). A determination is made as to whether the data object already exists in the cache (step 704). If the data object does not already exist, the process creates the data object in the cache (step 706) and then marks the data object's epoch as the pending epoch (step 710). If the data object already exists in step 704, the process updates the existing data object with the new data in place (step 708), and the object's epoch is updated to the pending epoch (step 710). Thereafter, the process returns to the caller (step 712) and ends.

Next, with reference to FIG. 8, a flowchart is shown illustrating a process for committing the epoch in accordance with a preferred embodiment of the present invention. The process begins and sets the pending epoch as committed (step 801). A determination is made as to whether the end of cache data is reached (step 802). If the process is not at the end of the cache data, a determination is made as to whether the data object epoch is equal to the committed epoch (step 804). If the data object epoch does not equal the committed epoch, then the data object is stale.

If the current object is stale, the process flushes the object from the cache (step 806), considers the next object (step 808), and returns to step 802 to determine whether the end of cache data is reached. If the current object is not stale in step 804, the process considers the next object (step 808) and returns to step 802 to determine whether the end of cache data is reached.

Returning to step 802, if the end of cache data is reached, the process returns to the caller (step 810) and ends.

Thus, the present invention solves the disadvantages of the prior art by providing a mechanism for the acquisition of a data set key prior to starting a populate. This key, referred to as the cache epoch, is obtained from the cache implementation by the cache manager that is performing the populate. The returned cache epoch is kept in the cache as the new pending epoch value. The cache manager then proceeds to load the cache with the new data set. As the data is added, the cache associates the data with the pending epoch. While the population occurs, the existing cached date remains active and object updates to existing data occurr in place. When the populate is complete, the cache manager commits the acquired epoch in the cache and, subsequently, the cache proceeds to purge all data that is not part of the current epoch.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a cache storing at least one data element comprising:

receiving a pending epoch value;

loading the cache with a new data element;

committing the cache using the pending epoch value; and identifying the pending epoch value as a committed epoch value.

2. The method of claim 1, wherein the step of loading the cache with a new data element comprises adding the new data element to the cache.

3. The method of claim 1, wherein the step of loading the cache with a new data element comprises updating one of the at least one data elements with the new data element.

4. The method of claim 1, further comprising marking an epoch value of the new data element with the pending epoch value.

5. The method of claim 4, wherein the step of committing the cache comprises:

identifying a stale data element; and flushing the stale data element from the cache.

6. The method of claim 5, wherein a data element is identified as a stale data element if its epoch value does not match the committed epoch value.

7. A method for managing a cache storing at least one data element comprising:

receiving a pending epoch value;

loading the cache with a new data element; and marking an epoch value of the new data element with the pending epoch value.

8. The method of claim 7, further comprising:

committing the cache using the epoch value; and identifying the pending epoch value as a committed epoch value.

9. The method of claim 8, wherein the step of committing the cache comprises:

identifying a stale data element; and flushing the stale data element from the cache.

10. The method of claim 9, wherein a data element is identified as a stale data element if its epoch value does not match the committed epoch value.

11. An apparatus for managing a cache storing at least one data element comprising:

receipt means for receiving a pending epoch value;

loading means for loading the cache with a new data element;

commitment means for committing the cache using the epoch value; and identification means for identifying the pending epoch value as a committed epoch value.

12. The apparatus of claim 11, wherein the loading means comprises means for adding the new data element to the cache.

13. The apparatus of claim 11, wherein the loading means comprises means for updating one of the at least one data elements with the new data element.

14. The apparatus of claim 13, further comprising means for marking an epoch value of the new data element with the pending epoch value.

15. The apparatus of claim 14, wherein the commitment means comprises:

means for identifying a stale data element; and means for flushing the stale data element from the cache.

16. The apparatus of claim 15, wherein a data element is identified as a stale data element if its epoch value does not match the committed epoch value.

17. An apparatus for managing a cache storing at least one data element comprising:

receipt means for receiving a pending epoch value;

loading means for loading the cache with a new data element; and marking means for marking an epoch value of the new data element with the pending epoch value.

18. The apparatus of claim 17, further comprising:

commitment means for committing the cache using the epoch value; and identification means for identifying the pending epoch value as a committed epoch value.

19. The apparatus of claim 18, wherein the commitment means comprises:

means for identifying a stale data element; and flushing means for flushing the stale data element from the cache.

20. The apparatus of claim 19, wherein a data element is identified as a stale data element if its epoch value does not match the committed pending epoch value.

21. A computer program product, in a computer readable medium, for managing a cache storing at least one data element comprising:

instructions for receiving a pending epoch value;

instructions for loading the cache with a new data element;

instructions for committing the cache using the epoch value.

22. A computer program product, in a computer readable medium, for managing a cache storing at least one data element comprising:

instructions for receiving a pending epoch value;

instructions for loading the cache with a new data element; and instructions for marking an epoch value of the new data element with the pending epoch value.

* * * * *